(12) United States Patent
McVeigh et al.

(10) Patent No.: US 7,748,958 B2
(45) Date of Patent: Jul. 6, 2010

(54) VORTEX GENERATORS ON ROTOR BLADES TO DELAY AN ONSET OF LARGE OSCILLATORY PITCHING MOMENTS AND INCREASE MAXIMUM LIFT

(75) Inventors: Michael A. McVeigh, Media, PA (US); Robert F. Maciolek, Glen Mills, PA (US)

(73) Assignee: The Boeing Company, Chicago, IL (US)

(*) Notice: Subject to any disclaimer, the term of this patent is extended or adjusted under 35 U.S.C. 154(b) by 515 days.

(21) Appl. No.: 11/610,317

(22) Filed: Dec. 13, 2006

(65) Prior Publication Data

US 2008/0145219 A1    Jun. 19, 2008

(51) Int. Cl.
*F01D 5/14* (2006.01)

(52) U.S. Cl. ............................. 416/1; 416/24; 416/36; 416/42; 416/61; 415/119

(58) Field of Classification Search ............... 415/119; 416/1, 23, 24, 36, 42, 61, DIG. 5
See application file for complete search history.

(56) References Cited

U.S. PATENT DOCUMENTS

| | | | |
|---|---|---|---|
| 2,545,010 A | | 3/1951 | Stalker |
| 3,713,750 A | * | 1/1973 | Williams .................. 416/20 R |
| 4,382,569 A | | 5/1983 | Boppe et al. |
| 5,054,720 A | | 10/1991 | Page |
| 5,209,438 A | * | 5/1993 | Wygnanski .................. 244/203 |
| 5,788,191 A | | 8/1998 | Wake et al. |
| 5,813,625 A | | 9/1998 | Hassan et al. |
| 5,938,404 A | | 8/1999 | Domzalski et al. |
| 5,957,413 A | | 9/1999 | Glezer et al. |
| 6,042,059 A | | 3/2000 | Bilanin et al. |

(Continued)

FOREIGN PATENT DOCUMENTS

EP    0481661    4/1992

(Continued)

OTHER PUBLICATIONS

Madsen, Casey, Hassan, Ahmed A., Schwimley, Scott, "Alteration of the FlowField in a Transonic Flow Environment Using Synthetic Jets", AIAA 2006-3159, copyright 2006.

(Continued)

*Primary Examiner*—Igor Kershteyn
(74) *Attorney, Agent, or Firm*—Harness, Dickey & Pierce, P.L.C.

(57) ABSTRACT

An airborne mobile platform generally includes a plurality of rotating rotor blades operating in an airflow that forms a boundary layer on each of the rotor blades. At least one of the rotor blades includes a section that encounters the airflow that includes an unsteady subsonic airflow having at least a varying angle of attack. At least one of the rotor blades also includes one or more vortex generators on the at least one of the rotor blades that generate a vortex that interacts with the boundary layer to at least delay an onset of separation of the boundary layer, to increase a value of an unsteady maximum lift coefficient and to reduce a value of an unsteady pitching moment coefficient for the section.

21 Claims, 12 Drawing Sheets

U.S. PATENT DOCUMENTS

| | | | |
|---|---|---|---|
| 6,092,090 A | 7/2000 | Payne et al. | |
| 6,092,990 A | 7/2000 | Hassan et al. | |
| 6,105,904 A * | 8/2000 | Lisy et al. | 244/200.1 |
| 6,109,566 A * | 8/2000 | Miller et al. | 244/207 |
| 6,135,395 A | 10/2000 | Collett | |
| 6,171,056 B1 * | 1/2001 | Lorber | 416/42 |
| 6,234,751 B1 | 5/2001 | Hassan et al. | |
| 6,267,331 B1 * | 7/2001 | Wygnanski et al. | 244/204 |
| 6,302,360 B1 | 10/2001 | Ng | |
| 6,390,116 B1 | 5/2002 | Kim et al. | |
| 6,471,477 B2 | 10/2002 | Hassan et al. | |
| 6,543,719 B1 | 4/2003 | Hassan et al. | |
| 6,644,598 B2 | 11/2003 | Glezer et al. | |
| 6,685,143 B1 | 2/2004 | Prince et al. | |
| 6,713,901 B2 | 3/2004 | Hassan et al. | |
| 6,821,090 B1 | 11/2004 | Hassan et al. | |
| 6,837,465 B2 * | 1/2005 | Lisy et al. | 244/204.1 |
| 6,866,234 B1 | 3/2005 | Hassan et al. | |
| 6,899,302 B1 * | 5/2005 | Hassan et al. | 244/208 |
| 6,994,297 B1 | 2/2006 | Hassan et al. | |
| 7,048,235 B2 | 5/2006 | McLean et al. | |
| 2002/0081198 A1 | 6/2002 | Hassan et al. | |
| 2002/0195526 A1 | 12/2002 | Barrett et al. | |
| 2004/0129838 A1 | 7/2004 | Lisy et al. | |
| 2005/0056731 A1 | 3/2005 | Hamilton et al. | |
| 2006/0027711 A1 | 2/2006 | Boldrin et al. | |

FOREIGN PATENT DOCUMENTS

| | | |
|---|---|---|
| EP | 1577212 | 9/2005 |
| EP | 1714869 | 10/2006 |

OTHER PUBLICATIONS

Geissler, W., et al., "Dynamic Stall and its Passive Control Investigations on the OA209 Airfoil Section", Germany, pp. 41.1-41.14.

Singh, C. et al., "Control of Rotorcraft Retreating Blade Stall Using Air-Jet Vortex Generators", Journal of Aircraft, vol. 43, No. 4, Jul.-Aug. 2006, pp. 1169-1176.

Kinneard, Doug, A Small Product's Big Potential, article, Boeing Frontiers Online, (Sep. 2003) vol. 2, Issue 5.

* cited by examiner

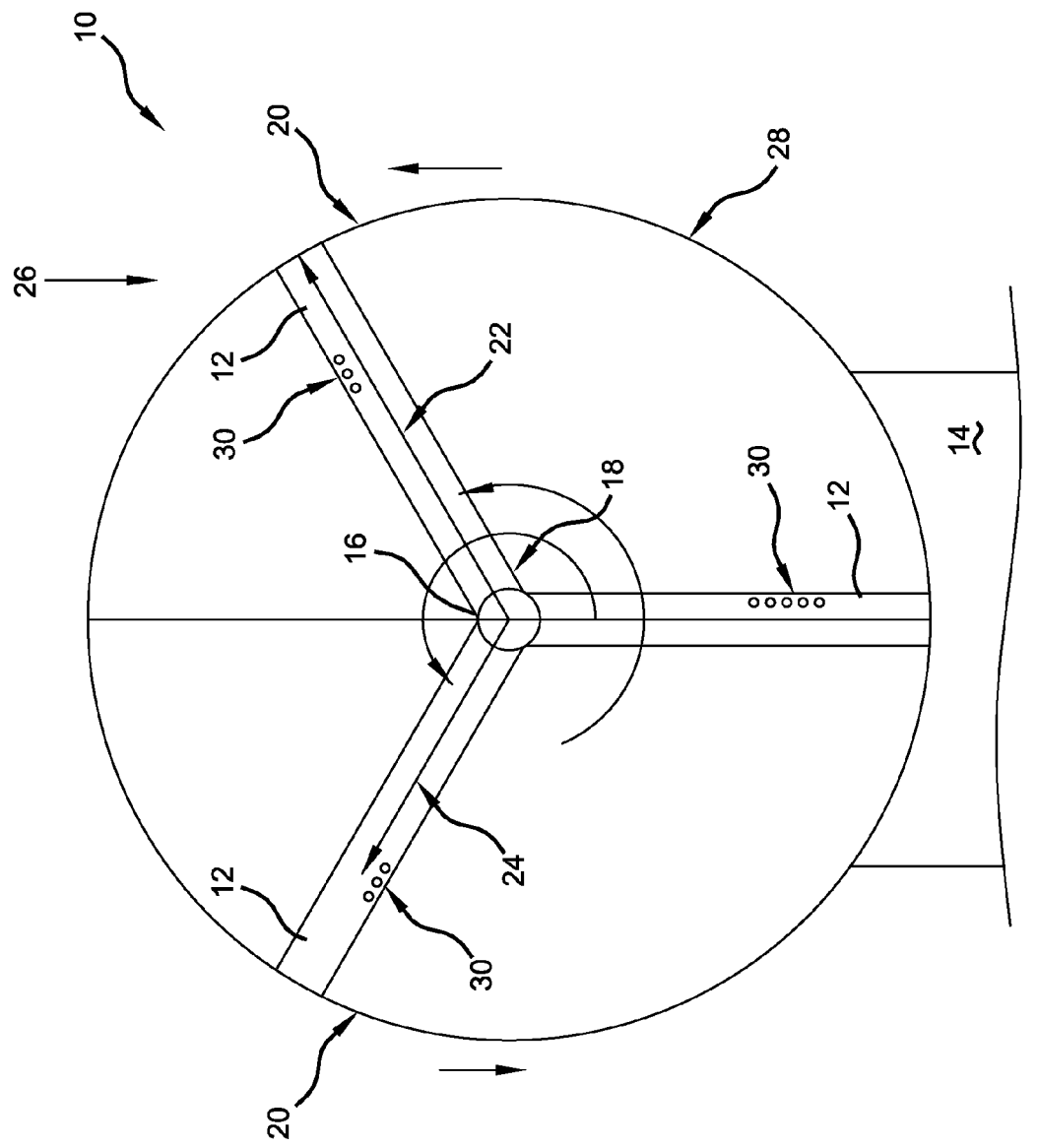

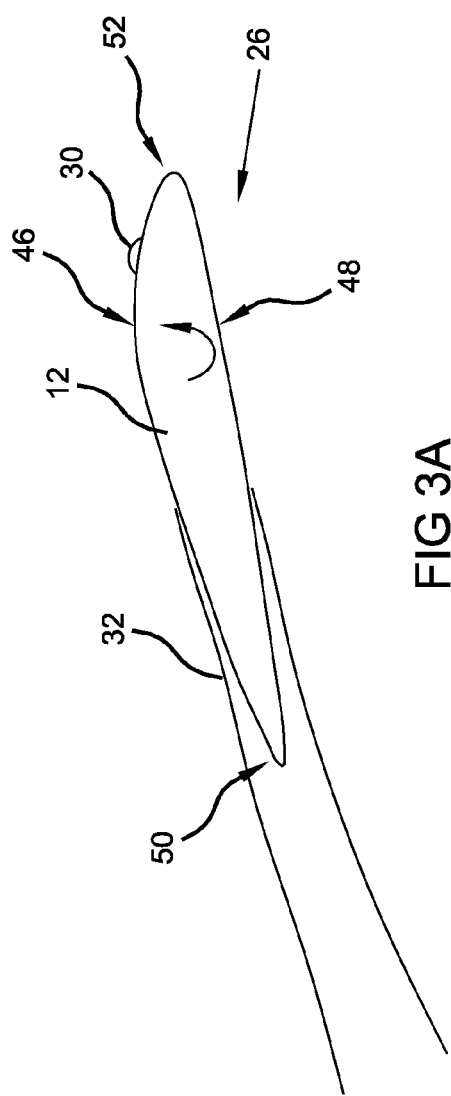
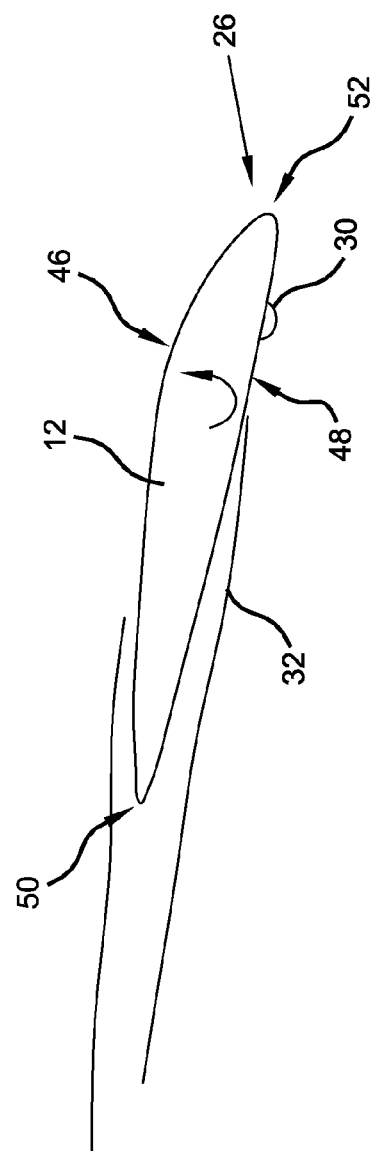
FIG 3A
FIG 3B

VORTEX GENERATORS ON ROTOR BLADES TO DELAY AN ONSET OF LARGE OSCILLATORY PITCHING MOMENTS AND INCREASE MAXIMUM LIFT

FIELD

The present teachings relate to an airborne mobile platform having rotating rotor blades and more particularly relate to vortex generators on each rotor blade of a rotorcraft to reduce the onset of boundary layer separation and dynamic pitching moments in an unsteady subsonic airflow.

BACKGROUND

There are many airborne mobile platforms that can employ one or more airfoils to supply, lift and/or thrust. In a fixed wing aircraft, for example, the wings (i.e., the airfoils) can experience relatively steady airflow. At relatively high angles of attack (i.e., orientation of the airfoil to the airflow) and/or relatively high airflow velocities, a boundary layer can sufficiently detach from a surface of the wing causing a stall condition. In the stall condition, the wings can experience a loss in lift.

Unlike wings on the fixed-wing aircraft, rotor blades of a rotorcraft can rotate with a rotor hub to which the rotor blades are connected. The rotating rotor blades are subject to cyclical variations in blade pitch angle, as well as unsteady high-subsonic airflow that can include relatively high frequency and relatively large amplitude variations in angle of attack and relatively rapid and periodic changes in an airflow velocity at one or more sections of each of the rotor blades. Rotor blades rotating through the unsteady airflow can have an increase in the maximum achievable lift (i.e., increase in airfoil section $C_{lmax}$) due to the unsteady variations in angle of attack.

While there can be an increase in the maximum achievable lift, when the rotor blade does stall (i.e., lift stall), the rotor blade can experience a relatively large nose-down pitching moment. The relatively large nose-down pitching moment (i.e., moment stall) which usually precedes the lift stall can cause large vibratory loads in rotor blade controls and the rotor hub. Because of these vibratory loads, the speed, weight, altitude and/or other performance parameters of the rotorcraft may need to be limited so that these high vibratory loads can be avoided. Moreover, flight time in such conditions can reduce the life of the rotor hub and the rotor blade controls and can increase maintenance costs.

Typically, the solidity of the rotor blade can be increased to delay the onset of boundary layer separation, i.e., the stall condition. Increasing rotor solidity can include increasing a chord of the rotor blade or increasing the number of blades. For certain overall weight and/or operating speeds, the increase in the solidity of the rotor blade can reduce a value of a local section lift coefficient (i.e., decrease $C_l$) at certain local rotor sections below the maximum value of achievable lift (i.e., $C_{lmax}$). By doing so, the onset of the stall condition can be delayed. While the stall condition can be delayed, the rotor blade can, nevertheless, stall. Moreover, increasing the solidity of the rotor blade can increase the magnitude of the pitching moment of the rotor blade by a square of the chord length (i.e., (pitching moment)~(chord length)$^2$).

To address the increased magnitude of the pitching moment, the rotor blade airfoils can be implemented with trailing edge tabs and/or a relatively moderate camber. The trailing edge tabs can be set at a negative angle, i.e., upward from the trailing-edge. Alternatively, the rotor blade airfoils can be designed to have negative camber (i.e., reverse camber) in a region of the trailing edge. The various combinations of changes to solidity and camber and the addition of trailing edge tabs can delay the onset of stall and can reduce the magnitude of the pitching moments due to the stall condition.

The various combinations can, however, add to the complexity and weight of the rotor blades especially increasing the number of rotor blades. Increasing the solidity of the rotor blades and/or increasing the number of the rotor blades can require more engine power to overcome increased profile drag produced by the rotor blades, as profile drag can be proportional to the blade area. Increased rotor blade solidity and/or camber and/or solidity can increase the weight of the rotor blades, the rotor hub, the rotor blade controls and associated structures of the rotorcraft. While the above rotor blade configurations remain useful for their intended purposes, there remains room in the art for improvement.

SUMMARY

The various aspects of the present teachings generally include an airborne mobile platform that generally includes a plurality of rotating rotor blades operating in an airflow that forms a boundary layer on each of the rotor blades. At least one of the rotor blades includes a section that encounters the airflow that includes an unsteady subsonic airflow having at least a varying angle of attack. At least one of the rotor blades also includes one or more vortex generators on the at least one of the rotor blades that generate a vortex that interacts with the boundary layer to at least delay an onset of separation of the boundary layer, to increase a value of an unsteady maximum lift coefficient and to reduce a value of an unsteady pitching moment coefficient for the section.

Further areas of applicability will become apparent from the description provided herein. It should be understood that the description and specific examples are intended for purposes of illustration only and are not intended to limit the present teachings.

BRIEF DESCRIPTION OF THE DRAWINGS

The drawings described herein are for illustration purposes only and are not intended to limit the present teachings in any way.

FIG. 1 is a diagram of a top view of a portion of a rotorcraft or other suitable airborne mobile airborne platform having rotor blades that can extend from a rotor hub in accordance with the present teachings.

FIG. 3A is a diagram of a side view of a rotor blade with one or more vortex generators attached to a top surface of the rotor blade to delay on onset of separation of the boundary layer in accordance with the present teachings.

FIG. 3B is a diagram of a side view of a rotor blade with one or more vortex generators attached to a bottom surface of the rotor blade to delay on onset of separation of the boundary layer in accordance with the present teachings.

DETAILED DESCRIPTION

Figure 2A:
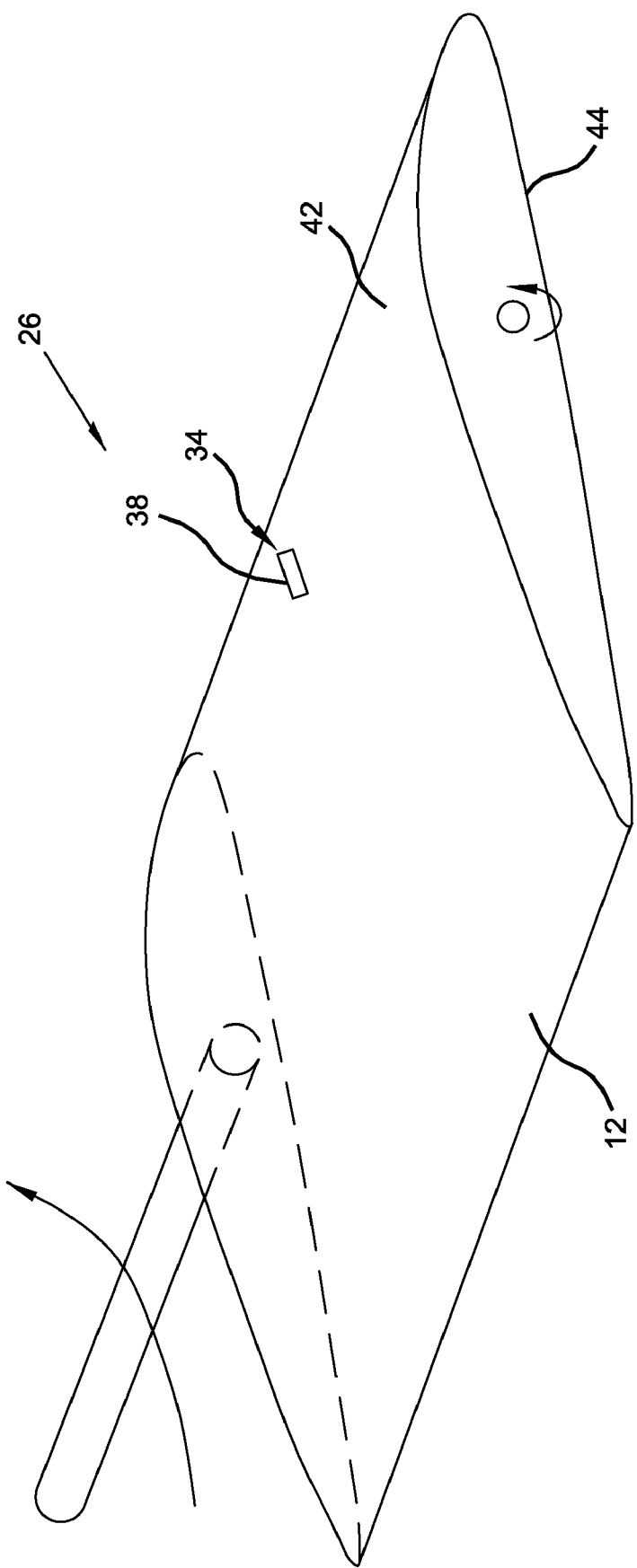
FIG. 2A is a diagram of a section of a rotor blade having a mechanical type of vortex generator connected thereto in accordance with one aspect of the present teachings.

The following description is merely exemplary in nature and is not intended to limit the present teachings, their application or uses. It should be understood that throughout the drawings, corresponding reference numerals indicate like or corresponding parts and features.

The various aspects of the present teachings can be applicable to any of a wide range of airborne mobile platforms. The teachings can be particularly useful with rotorcrafts such as helicopters, tilt rotors, autogiros, etc. The present teachings are also applicable to both unmanned and manned aircraft that can be controlled directly, remotely, via automation, and/ or one or more suitable combinations thereof. The various aspects of the present teachings can be applicable to any of a wide range of lift producing and/or thrust producing surfaces such as main rotors, secondary main rotors, rear rotors, etc. Accordingly, specific references to an airfoil and/or to rotor blades herein should not be construed as limiting the scope of the present teachings to those specific implementations.

Moreover, certain terminology can be used for the purpose of reference only and need not limit the present teachings. For example, terms such as "upper," "lower," "above" and "below" can refer to directions in the drawings to which reference is made. Terms such as "front," "back," "rear," and "side" can describe the orientation of portions of the component within a consistent but arbitrary frame of reference which can be made more clear by reference to the text and the associated drawings describing the component under discussion. Such terminology may include the words specifically mentioned above, derivates thereof and words of similar import. Similarly, the terms "first," "second" and other such numerical terms referring to structures, systems and/or methods do not imply a sequence or order unless clearly indicated by the context.

In accordance with various aspects of the present teachings and with reference to FIG. 1, one or more airborne mobile platforms 10, such as an airplane, a helicopter, an autogiro, a tilt rotor, etc., can employ rotor blades 12 to create lift and/or thrust. In one example, a rotorcraft 14 can have the rotor blades 12 that can extend from a rotor hub 16. Each of the rotor blades 12 can have a chord and a span. Each of the rotor blades 12 can couple to the rotor hub 16 at a blade root 18 that is distal from a blade tip 20 in a spanwise direction.

The rotorcraft 14 can travel in generally a forward direction. In this regard, one of the rotor blades 12 can be in an advancing condition 22 and another one of the rotor blades 12 can be in a retreating condition 24. Each of the rotor blades 12 experiences an airflow 26 that can be affected by an immediately preceding rotor blade, as the rotor blades 12 can travel in their circular path, i.e., a rotor disc 28. In this regard, each of the rotor blades 12 can experience unsteady airflow conditions arising from application of controlled periodic changes in blade pitch (i.e., cyclic pitch) and general airflow disturbances caused by the wakes of the other blades or other parts of the rotorcraft 14. These unsteady airflow conditions can cause sections of the rotor blade 12 to experience relatively high frequency and/or for relatively large amplitude variations in angle of attack and/or Mach number. The Mach number of the airflow 26 can be subsonic. In one example, the operating parameters of the rotorcraft 14 can include the Mach number of the airflow 26 being in a range from about 0.2 to 0.8 on the advancing blade (i.e., one of the rotor blades 12 in the advancing condition 22) and 0 to 0.6 on the retreating blade, (i.e., one of the rotor blades 12 in the retreating condition 24).

One or more vortex generators 30 can be implemented on one or more of the rotor blades 12 in various forms and/or at various predetermined positions. In general and as shown in FIGS. 3A and 3B, vortices generated by the vortex generators 30 increase the reluctance of a boundary layer 32 to separate from the rotor blade 12 under conditions of high amplitude and/or high frequency changes in airfoil angle-of-attack. By keeping the boundary layer 32 substantially attached to the rotor blade 12, as shown in FIGS. 3A and 3B, the rotor blade 12 can tolerate greater variations of angle-of-attack and Mach number before the rotor blade 12 enters dynamic moment stall. This can especially be so for the rotor blade 12 in the retreating condition 24. In this regard, the relatively large and dynamic pitching moments can be reduced or avoided by reducing and/or avoiding the onset of stall.

More specifically, the unsteady airflow experienced by the rotor blades 12 can establish high frequency variations in angle-of-attack and/or Mach number over one or more sections of the rotor blades 12, which can result in the rotor blade 12 experiencing varying values of the local lift coefficient (i.e., $C_l$) for the section of the rotor blade 12. The vortices from the vortex generators 30, however, can increase the local values of the maximum lift coefficient (i.e., $C_{lmax}$) and delay the abrupt change in section pitching moment for that section of the rotor blade 12. In this regard, the values of the lift coefficient can be maintained below the values of the maximum lift coefficients. In another instance, the values of lift coefficient can be increased to such a point that the boundary layer 32 can separate from the rotor blade 12, in other words, encounter the stall condition. When the rotor blade 12 does experience the stall condition, the pitching moments due to the stall condition can be reduced relative to pitching moments on rotor blades 12 whose solidity and/or camber had been modified to delay the onset of boundary layer 32 separation and moreover have not implemented the vortex generators 30 in accordance with the present teachings.

Figure 2B:
FIG. 2B is similar to FIG. 2A and shows a section of a rotor blade with one type of a fluidic vortex generator in accordance with another aspect of the present teachings.
Figure 2C:
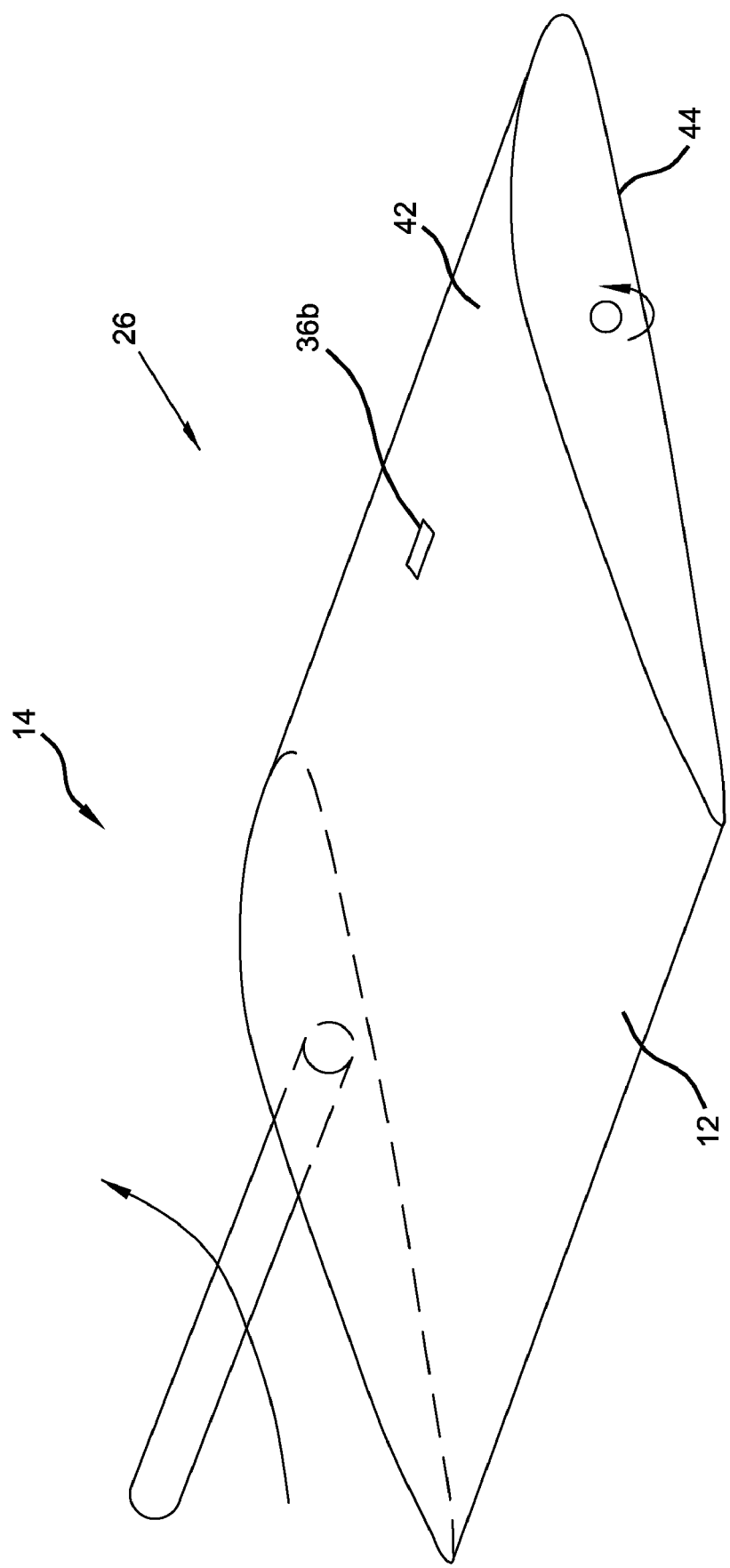
FIG. 2C is similar to FIG. 2B and shows another type of fluidic vortex generator in accordance with a further aspect of the present teachings.
Figure 2D:
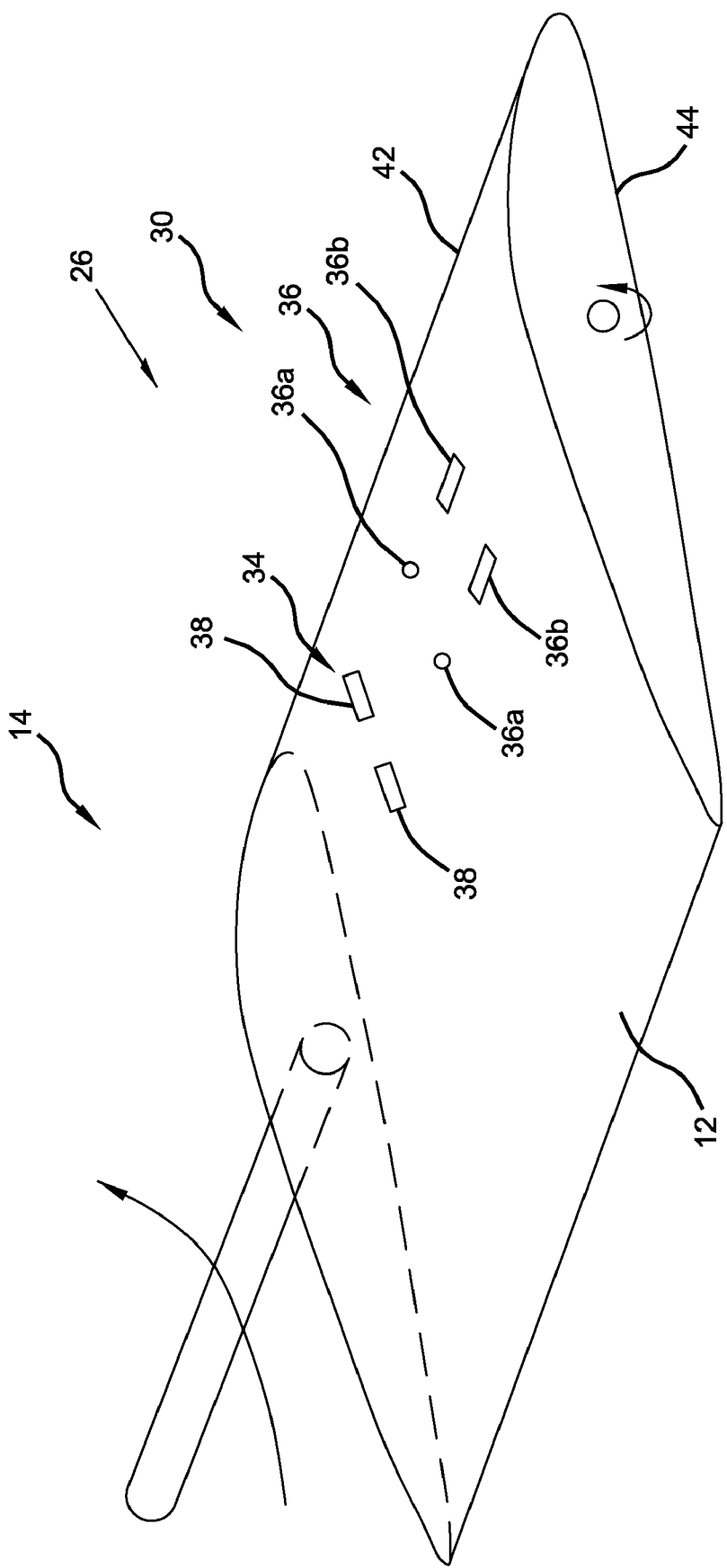
FIG. 2D is a diagram of a section of a rotor blade having various types of vortex generators connected thereto in accordance with yet another aspect of the present teachings.
Figure 4:
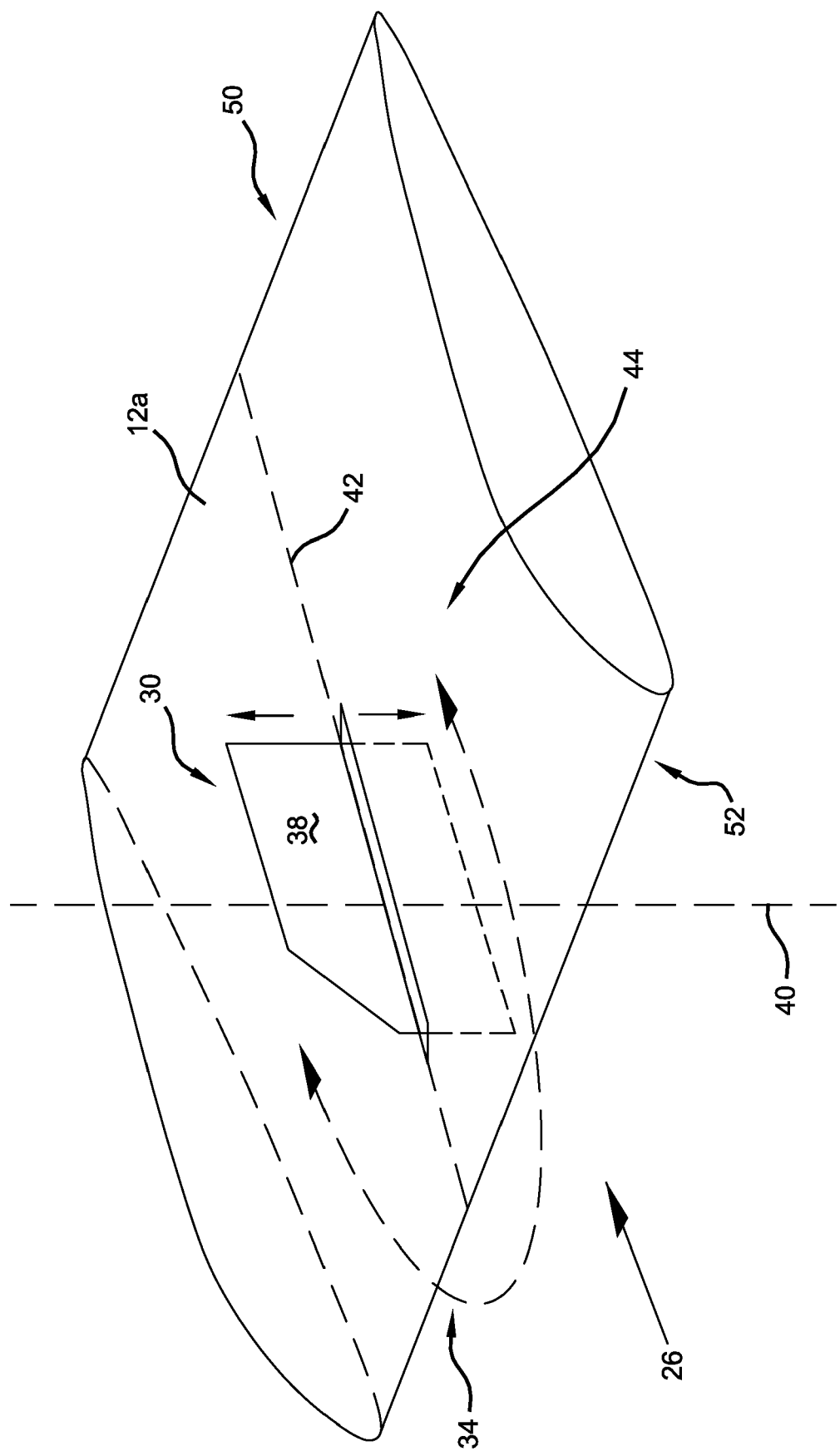
FIG. 4 is a diagram of a section of a rotor blade having a vortex generator configured as a vane that can be moved between an extended condition and a retracted condition and/ or can be selectively yawed in accordance with the present teachings.

As shown in FIG. 2D, the vortex generators 30 can be mechanical and/or fluidic devices that can be deployed on the rotor blades 12 in certain predetermined configurations. As shown in FIGS. 2A and 4, mechanical vortex generators 34 can be devices that physically extend into the airflow 26, such as a tab, a vane, etc. As shown in FIGS. 2B and 2C, fluidic vortex generators 36 can be devices that can inject a jet flow into and/or extract the jet flow from the airflow 26 such as piezoelectric pulse jets, zero net mass jets, etc. In FIG. 2B, the fluidic vortex generators 36 can be an oval or round fluidic vortex generator 36a (e.g., an orifice associated with one of the fluidic vortex generators 36 is oval or round). In FIG. 2C, the fluidic vortex generators 36 can be rectangular fluidic vortex generators 36b (e.g., an orifice associated with one of the fluidic vortex generators 36 is rectangular). The vortex generators 30 can all be a single type of vortex generator 30 (e.g., all mechanical vortex generators 34 as shown in FIG. 2A). Alternatively, one or more types of vortex generators 30 that can be employed on each or all of the rotor blades 12 and/or one or more suitable combinations thereof, as shown in FIG. 2D.

The mechanical vortex generators 34 can be fixed (i.e., not movable relative to the rotor blade 12) or can be adjustable. In one example and with reference to FIG. 4, the vortex generators 30 can include one or more vanes 38 that can be placed at specific chord and span positions along the rotor blade 12a. The vanes 38 can be stationary, the vanes 38 can move relative to the rotor blade 12a and a combination thereof. Movement of the vanes 38 can include various deviations in pitch, roll and/or yaw relative to an initial position. In one example, the vanes 38 can be fixed in the direction of pitch and roll but can be yawed (i.e., generally rotated about a z-axis 40 that can be generally normal to a ground blade section chord line 42). The yawing of each vane 38 can be based on an angle of attack of the rotor blade 12a, the airflow velocity, the position of the rotor blade 12a on which the vortex generators 30 can be attached in the rotor disc 28 (FIG. 1) (e.g., the blade being in the retreating condition 24 as opposed to the advancing condition 22) and/or one or more combinations thereof.

The vanes 38, whether fixed and/or adjustable can be extended from, and retracted into, a surface 44 of the rotor blade 12a. Moreover, the vanes 38 and/or one or more other suitable vortex generators 30 can be implemented on a top surface 46 (FIG. 3A) and/or a bottom surface 48 (FIG. 3B) of the rotor blade 12, 12a and/or combinations thereof. The yawing, extension, retraction and/or one or more combinations thereof of one or more of the vanes 38 can be based on an angle of attack of the rotor blade 12, the velocity of the airflow 26, the position of the rotor blade 12 on which one or more of the vortex generators 30 are attached in the rotor disc 28 (FIG. 1) and/or one or more combinations thereof.

Figure 5:
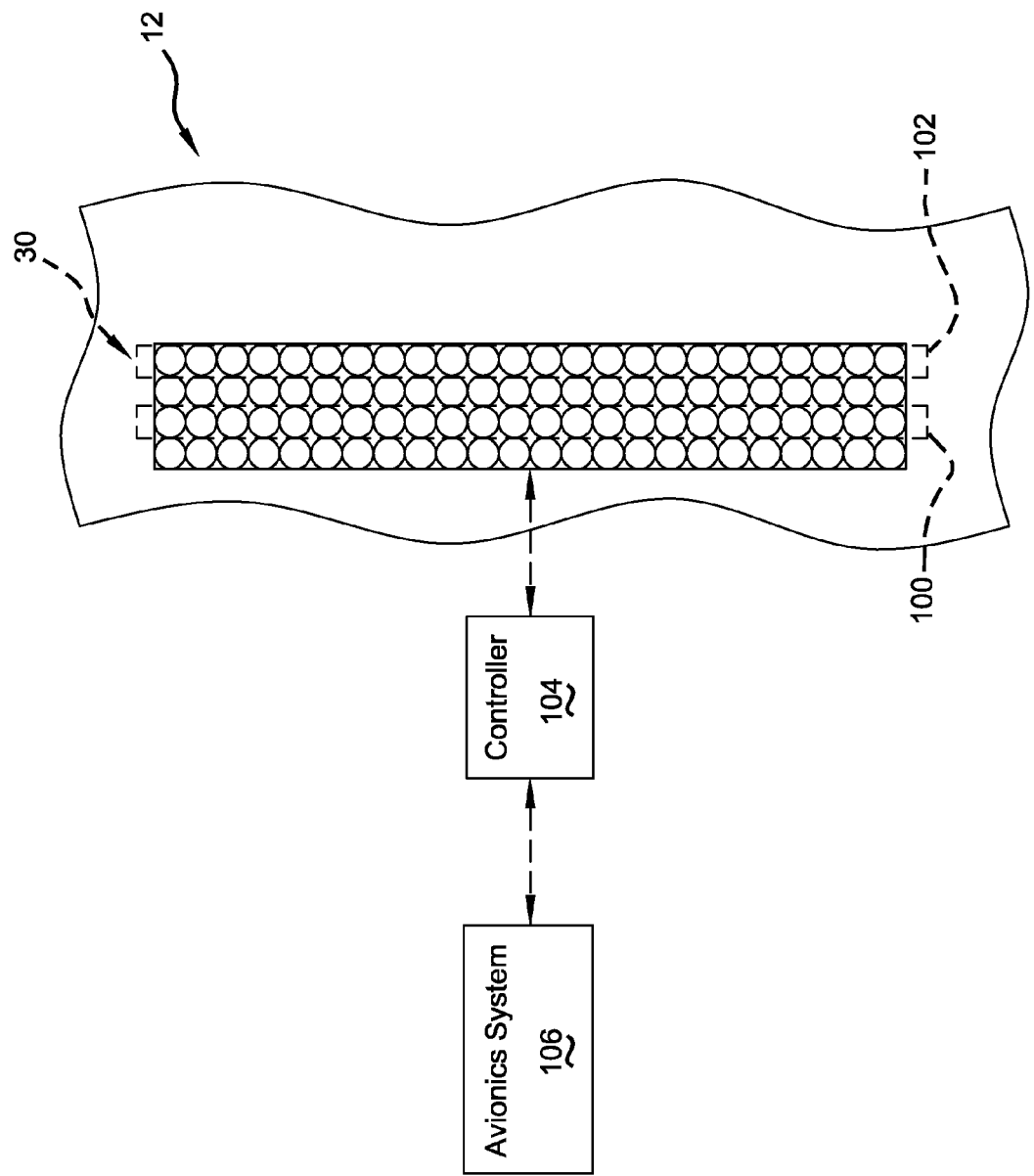
FIG. 5 is a diagram of an exemplary control system for one or more vortex generators in accordance with the present teachings.

In an example implementing fluidic vortex generators 36, one or more of the fluidic vortex generators 36 can be placed at certain chord and span positions. In one example and with reference to FIG. 5, the vortex generators 30 can be arranged so that multiple vortex generators 30 on the rotor blade 12 can be divided into a first set 100, a second set 102, etc., which are part of a closely spaced array of fluidic vortex generators. Each of the sets 100, 102 can be in an active condition (e.g., oscillating between injecting and extracting the jet flow) or in an inactive condition (e.g., neither injecting nor extracting). When each of the sets 100, 102, etc. is in the active condition, each of the fluidic vortex generators 36 inject and/or extract the jet flow in a similar or dissimilar fashion relative to other fluidic vortex generators 36 in the same set. For example and as applicable, the first set 100 can all be in the active condition but certain fluidic vortex generators 36 in the first set 100 can inject and/or extract the jet flow differently than other fluidic vortex generators 36 in the first set 100.

The first set 100 and the second set 102, etc. of the fluidic vortex generators 36 can be associated with certain chord positions and/or span positions so that activating and deactivating certain fluidic vortex generators 36 can correspond to certain locations on the rotor blade 12. In addition, as flight conditions and/or rotor blade 12 orientation change (i.e., change in an angle of incidence), the amount of either active or inactive fluidic vortex generators 36 can change. Further, the fashion in which each of the fluidic vortex generators 36 can inject and/or extract the jet flow (e.g., change in magnitude, frequency, pulse width, etc.) can change as flight conditions and/or rotor blade 12 orientation change.

In one example, the fluidic vortex generators 36 can include one or more oscillating jets that can be similar to those disclosed in the following commonly assigned United States Patents: U.S. Pat. No. 6,899,302, titled Method and Device for Altering the Separation Characteristics of Flow over an Aerodynamic Surface via Hybrid Intermittent Blowing and Suction, issued May 31, 2005; U.S. Pat. No. 6,866,234, titled Method and Device for Altering the Separation Characteristics of Air-flow over an Aerodynamic Surface via Intermittent Suction, issued Mar. 15, 2005; U.S. Pat. No. 6,713,901, titled Linear Electromagnetic Zero Net Mass Jet Actuator, issued Mar. 30, 2004; and U.S. Pat. No. 6,471,477, titled Jet Actuators for Aerodynamic Surfaces, issued Oct. 29, 2002. The above references are hereby incorporated by reference as if fully set forth herein.

The mechanical vortex generators 34 and/or the fluidic vortex generators 36 can be controlled by a controller 104 that can be integral to or in addition to existing avionic systems 106 or other suitable navigational, flight control, flight communication, etc. systems in the rotorcraft 14 (FIG. 1). As such, the pilot (whether human and/or computer) can directly and/or indirectly control the switching of each of the fluidic vortex generators 36 between the active and inactive conditions and/or can control the fashion in which each of the fluidic vortex generators 36 operate, the deployment of the fluidic and/or mechanical vortex generators 34, 36 and/or the positioning of the vortex generator (e.g., yawing the mechanical vortex generator 34) to further facilitate the delay of the onset of stall for the rotor blades 12.

For purposes of this discussion, each of the rotor blades 12 can be divided into multiple sections so that load and aerodynamic characteristics of each section can be discussed and/or modeled and an interaction of each and all of the sections can be assessed to provide an efficient design for a complete (i.e., finite) rotor blade 12. Each section of the rotor blade 12 can experience differing load and/or aerodynamic characteristics for a myriad of reasons such as the airflow 26 being unsteady, the rotor blade 12 experiencing increased airspeed at the tip 20 (FIG. 1) of the rotor blade 12, twist and/or aeroelastics of the rotor blade 12, etc.

It will be appreciated in light of the disclosure that vortex generators 30 in some sections can delay the onset of stall but in other sections, the vortex generators 30 can delay the onset to a lesser extent or not at all. In this regard, the separation of the boundary layer 32 is not always an event that quickly occurs across the entire rotor blade 12. The boundary layer 32 can partially separate in some sections of the rotor blade 12, while remaining generally attached in others. As a result, the global effect can be a delay in the overall onset of stall, even though the airflow 26 over some sections of the rotor blade 12 can best be characterized as in the stall condition.

Figure 6:
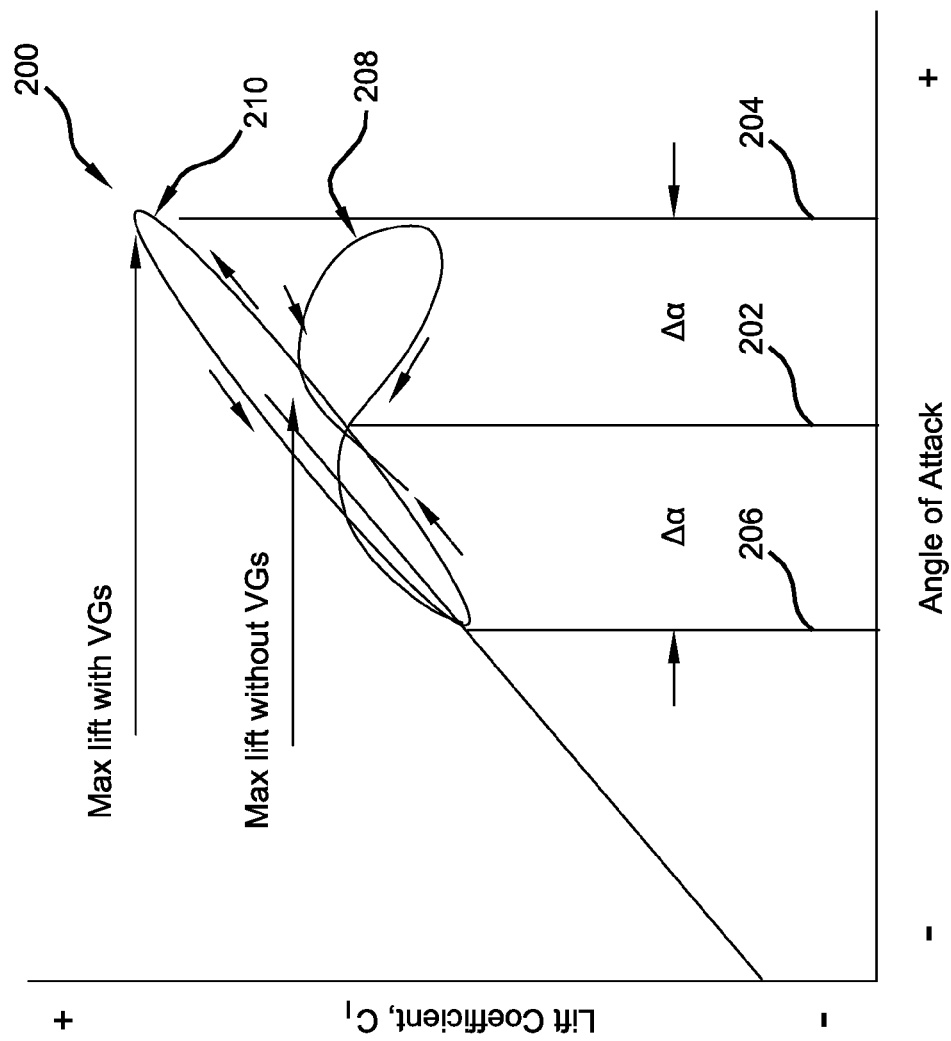
FIG. 6 is a diagram showing values of lift coefficient and angle of attack for an exemplary rotor blade having vortex generators in accordance with the present teachings.

A diagram 200 in FIG. 6 shows the effect of vortices generated by the vortex generators 30 on a value of lift coefficient versus a value of angle of attack for the rotor blade 12 (FIG. 1). The value of angle of attack can change in a periodic fashion from a nominal angle of attack 202. A value of a maximum angle of attack 204 and a value of a minimum angle of attack 206 are shown as the angle of attack of the rotor blade varies in the periodic fashion. A first data series 208 indicates a value of the lift coefficient relative to values of angle of attack for a rotor blade without any vortex generators 30 implemented thereon. A second data series 210 indicates a value of the lift coefficient relative to values of angle of attack for a rotor blade with one or more vortex generators 30 implemented thereon in accordance with the present teachings. It can be shown that as the values of angle of attack fluctuate in the periodic fashion typically experienced by rotating rotor blades 12, the effects of vortices from the vortex generators 30 can provide relatively higher values of lift coefficient.

Figure 7:
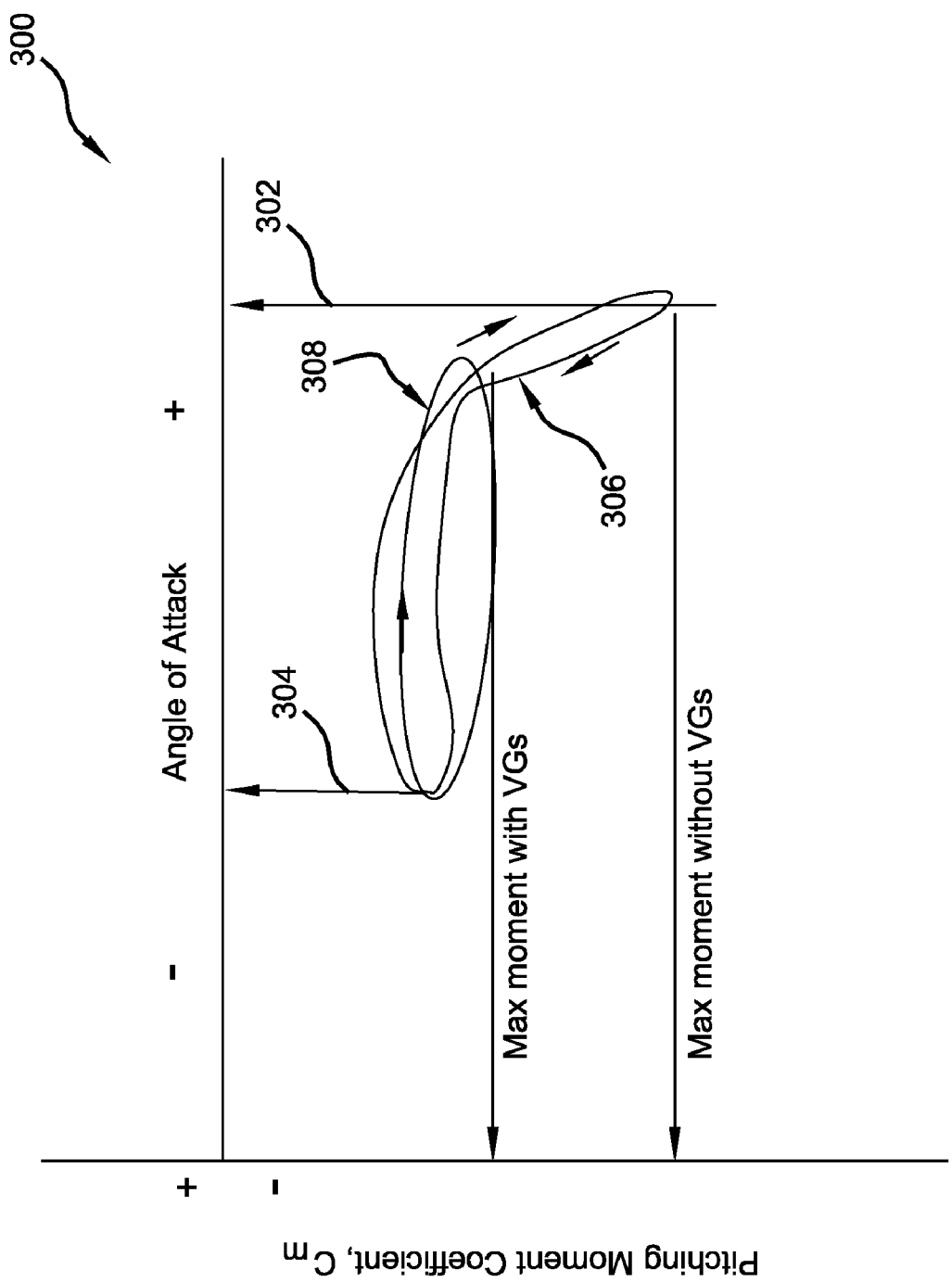
FIG. 7 is a diagram showing values of pitching moment coefficient and angle of attack for an exemplary rotor blade having vortex generators in accordance with the present teachings.

A diagram 300 in FIG. 7 shows the effect of vortices generated by the vortex generators 30 on a value of pitching moment coefficient versus a value of angle of attack for the rotor blade 12 (FIG. 1). The value of angle of attack can vary in a periodic fashion between a maximum angle of attack 302 and a minimum angle of attack 304. A first data series 306 indicates a value of the pitching moment coefficient relative to values of angle of attack for a rotor blade without any vortex generators 30 implemented thereon. A second data series 308 indicates a value of the pitching moment coefficient relative to values of angle of attack for a rotor blade with one or more vortex generators 30 implemented thereon in accordance with the present teachings. As the values of angle of attack fluctuate in the periodic fashion typically experienced by rotating rotor blades 12, the effects of vortices from the vortex generators 30 can provide relatively lower values of pitching moment coefficient.

The vortex generators 30, in accordance with the present teachings, can be implemented on a rotor blade 12 that was otherwise initially constructed without the vortex generators 30, such as in a retrofit process. At low Mach numbers (i.e., near or below M=0.4) and at high angles of attack, particularly in the unsteady flow environment of a rotor blade, the vortex generators 30 can cause the boundary layer 32 to remain attached over a trailing edge region 50 (FIG. 3A) while increasing suction over a leading edge region 52 (FIG. 3A). This can be shown to result in higher lift, lower drag and lower local pitching moments compared to an airfoil without the vortex generators 30. Depending on the Mach number, however, the pitch rate of the rotor blade and the increased airflow velocity over the leading edge region 52 can be shown to result in a high and possibly detrimental velocity gradient over a section of the rotor blade 12. In some instances, a pocket of supersonic flow can be shown to occur ahead of the vortex generators 30. The high velocity gradient and/or the pocket of supersonic flow can cause separation of flow closer to the leading edge rather than the trailing edge, which can negate the benefit of the vortex generators 30.

The vortex generators 30 can also be implemented on a rotor blade 12 that is initially constructed with the vortex generators 30 so that other characteristics of the rotor blade 12 can be modified and/or tailored to further benefit from the implementation of the vortex generators 30. In one example, the leading edge of the rotor blades can be altered (e.g., adjust camber, bluntness, etc.) to slow the airflow along the section of the rotor blade 12. Various shapes of the rotor blade 12 can be implemented with the vortex generators 30. The configuration of the rotor blade 12 and the placement of the vortex generators 30 are based on a myriad of parameters that affect or define the rotorcraft 14. In certain instances, a more desirable velocity distribution over the rotor blade 12 in combination with a certain placement of the vortex generators 30 can be achieved by adjusting the thickness, the camber, the leading edge radius of the rotor blade 12 and one or more combinations thereof.

Certain implementations can be determined by initiating an iterative design process to provide an optimized configuration of the vortex blade 12, airfoil and the vortex generators. The improved velocity distribution over the rotor blade in combination with certain placement of the vortex generators 30 can add to the reluctance of the boundary layer 32 to separate from the rotor blade 12.

Figure 8:
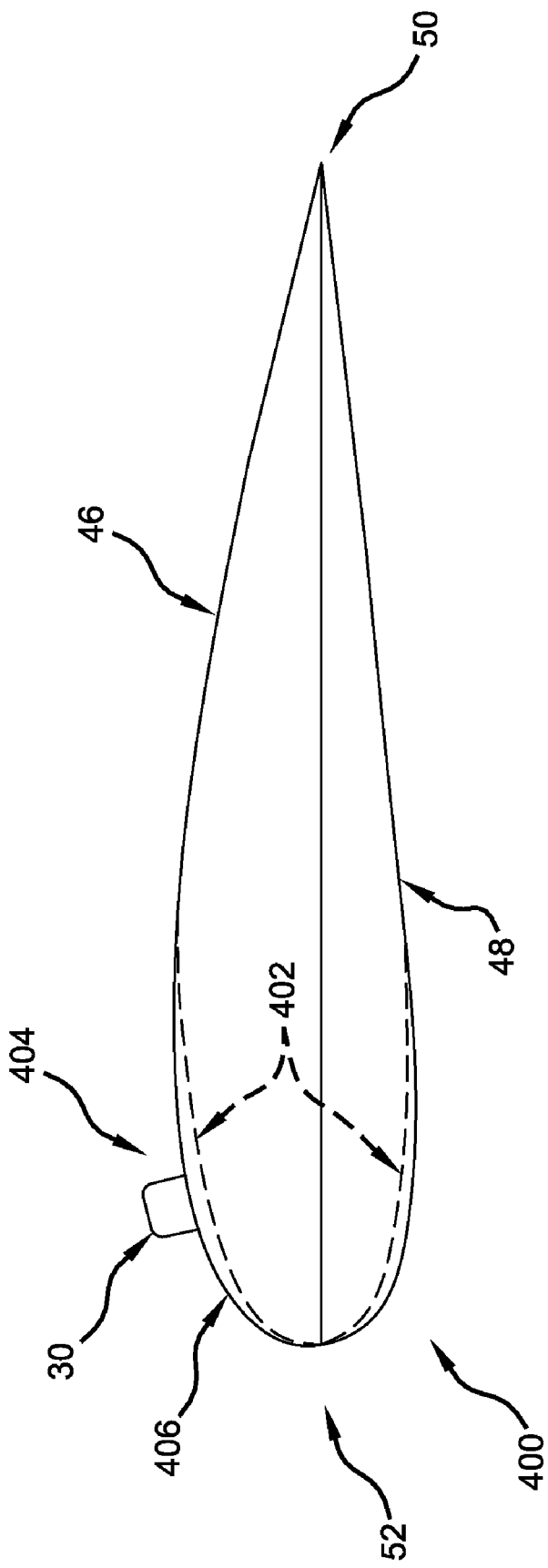
FIG. 8 is a diagram showing a rotor blade airfoil showing a baseline bluntness and an altered bluntness that can be combined with one or more vortex generators so that the velocity profile over airfoil design to increase the benefits provided by the vortex generators in accordance with the present teachings.

In one example and with reference to FIG. 8, an airfoil 400 can have a baseline bluntness 402 and an altered bluntness 404. The bluntness of a leading edge 406 of the airfoil 400 can be adjusted by adjusting the radius of curvature of the leading edge 406. The rotor blade 12 with the altered bluntness 404 on the leading edge 406 can also include one or more vortex generators 30 and therefore define an example of an airfoil that has been modified to accommodate and benefit from the vortex generators 30 relative to an airfoil having the baseline bluntness 402 to which a vortex generator 30 is simply attached.

In various examples of the present teachings, the vortex generators 30 can establish a series of vortices. There can be a given number of vortices and, moreover, the spacing, the direction, the phase, the strength and one or more combinations thereof can be controlled to tailor the vortex generators 30 to a suitable aerodynamic environment or multiple environments typically encountered by the rotorcraft 14. At the least the above parameters can be simulated and/or tested empirically on various airborne mobile platforms to produce one or more suitable configurations of vortex generators 30 to benefit the airborne mobile platform.

The various aspects of the vortex generators 30 can be implemented to lower at least the oscillatory loads on the rotor controls, hub, and structure of a rotorcraft 14. This can help to reduce component wear-and-tear and increase the life of the rotorcraft 14. The vortex generators 30 can also be used to generally maintain the oscillatory loads on the rotor controls, hub and structure of a rotorcraft 14 but can be used to expand the performance envelope of the rotorcraft 14. In doing so, the use of the vortex generators 30 can enable higher thrust levels without exceeding rotor control load limits. Moreover, the vortex generators 30 can expand current flight envelopes of rotorcraft 14 and thereby achieve increased speed, altitude, vertical lift, maneuver capability and combinations thereof.

In one aspect of the present teachings, the vortex generators 30 can be applied to rotor blades 12 that can be included in a tail rotor of a suitable rotorcraft. By implementing the vortex generators 30 on the tail rotor, the maximum thrust produced by the tail rotor can be increased, thereby increasing a low-speed yaw maneuvering capability of the rotorcraft 14. Moreover, rotorcraft 14 that have implemented the vortex generators 30 on the rotor blades 12 of a main rotor can also use the vortex generators 30 on a tail rotor to, among other things, offset the yawing moment associated with the performance increase of the main rotor.

Figure 9:
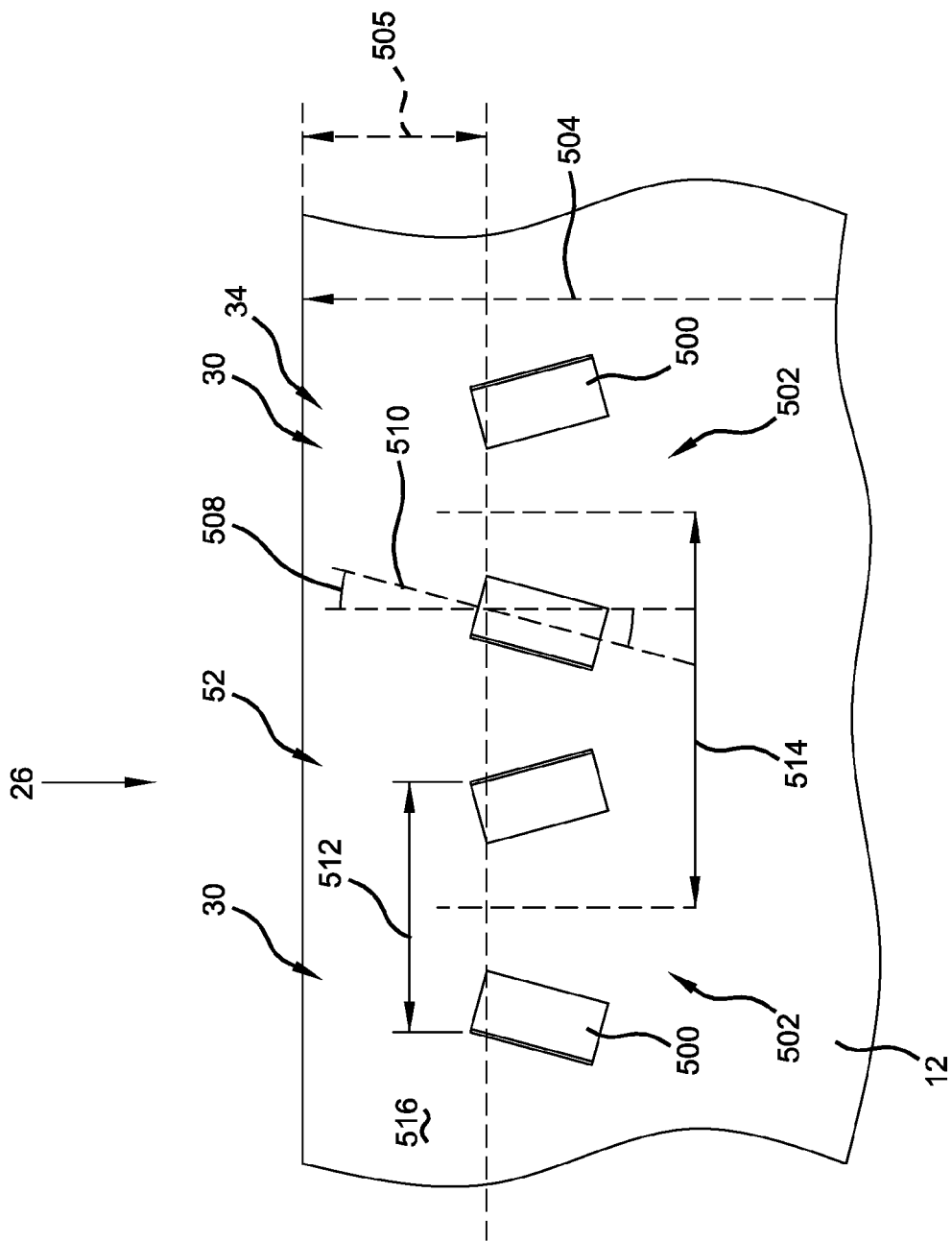
FIG. 9 is a diagram of a section of a rotor blade having pairs of a mechanical type of vortex generator connected thereto in accordance with a further aspect of the present teachings

In one aspect of the present teachings, the vortex generators 30 can be implemented on each of the rotor blades 12 on the rotorcraft 14 (FIG. 1). As shown in FIG. 9, the vortex generators 30 can define mechanical vortex generators 34 that are arranged along the leading edge region 52 of the rotor blade 12. Specifically, the vortex generators 30 can be vanes 500 that can be arranged in pairs 502 in the leading edge region 52 so that each of the pairs 502 of the vortex generators 30 are disposed at a location that is about 10% of a chord line 504 of one of the rotor blades 12 thereby defining a location 505 that is near the leading edge. Each of vanes 500 in a single pair 502 can be oriented on the rotor blade 12 so that a leading edge 506 of each of the vanes 500 in the pair 502 are pointed toward one another and thus can form an angle 508 that is, in one example, about fifteen degrees from the chord line 504 of the rotor blade 12. Put another way, a direction parallel to a vortex generator chord line 510 can establish the angle 508 with a direction that is parallel to the chord line 504 of the rotor blade 12.

In one example, each of the vanes 500 of the pair 502 can be spaced from one another a distance 512 of about 0.25 inches (about 6.35 millimeters) measured from about the quarter chord of each vane 500. Each of pairs 502 can be spaced from other pairs of vanes 500 on the rotor blade 12 a distance 514 that is about one inch (about 25.4 millimeters). Each of the vanes 500 can be about 0.2 inches (about 5.08 millimeters) long (i.e., along the vortex generator chord line 510) and can be about 0.1 inch (about 2.54 millimeters) tall (i.e., a dimension normal from a surface 516 of the rotor blade 12. The thickness of the vane 500 can be about 0.025 inches (about 0.635 millimeters).

In a further example, the vanes 500 can be configured for certain applications, one of which can include a rotorcraft 14 having two main rotors like a Boeing Chinook CH-47. In such an application, each of the vanes 500 of the pair 502 can be spaced from one another a distance of about 0.75 inches (about 19.1 millimeters) measured from about the quarter chord of each vane 500. Each of pairs 502 can be spaced from other pairs of vanes 500 on the rotor blade 12 a distance that is about three inches (about 76.2 millimeters). Each of the vanes 500 can be about 0.6 inches (about 15.2 millimeters) long (i.e., along the vane chord line) and can be about 0.3 inch (about 7.62 millimeters) tall (i.e., a dimension normal from the surface 516 of the rotor blade. The thickness of the vane 500 can be about 0.075 inches (about 1.91 millimeters). It will be appreciated in light of the disclosure that other configurations of the vortex generators 30 can be implemented based on the airborne mobile platform and the mission for that airborne mobile platform.

While specific aspects have been described in this specification and illustrated in the drawings, it will be understood by those skilled in the art that various changes can be made and equivalents can be substituted for elements thereof without departing from the scope of the present teachings, as defined in the claims. Furthermore, the mixing and matching of features, elements and/or functions between various aspects of the present teachings may be expressly contemplated herein so that one skilled in the art will appreciate from the present teachings that features, elements and/or functions of one aspect of the present teachings may be incorporated into another aspect, as appropriate, unless described otherwise above. Moreover, many modifications may be made to adapt a particular situation, configuration or material to the present teachings without departing from the essential scope thereof. Therefore, it may be intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. An airborne mobile platform comprising:
   a plurality of rotating rotor blades operating in an airflow that forms a boundary layer on each of the rotor blades, at least one of said rotor blades including:
      a section that encounters the airflow, where the airflow includes an unsteady subsonic airflow having at least a varying angle of attack;
      one or more vortex generators on said at least one of the rotor blades that generate a vortex that interacts with the boundary layer to at least delay an onset of separation of the boundary layer, to increase a value of an unsteady maximum lift coefficient and to reduce a value of an unsteady pitching moment coefficient for said section;
   wherein said one of the vortex generators includes a vane that extends outwardly from a surface of said section; and
   said vane is adjustable about an axis generally perpendicular to a surface of its associated said rotor blade, to move in a yaw direction relative to the airflow.

2. The airborne mobile platform of claim 1 wherein a shape of at least said section is altered to change a velocity distribution over said at least one of said rotor blades based on an effect of placement of said one or more vortex generators and wherein said shape of said section is altered to change at least one of a thickness, a bluntness, a leading edge radius, a camber and one or more combinations thereof.

3. The airborne mobile platform of claim 1 wherein said one or more vortex generators includes a jet in said section that at least one of extracts and injects a jet flow into said boundary layer.

4. The airborne mobile platform of claim 1 wherein said one or more vortex generators are positioned at a location on one of the rotor blades that corresponds to about ten percent chord of said at least one of said rotor blades.

5. The airborne mobile platform of claim 1 wherein said one or more vortex generators includes at least a first mechanical vortex generator that defines a vortex generator chord line and wherein a direction parallel to said vortex generator chord line establishes a first angle with a direction parallel to a chord line of at least one of said rotor blades on which said first mechanical vortex generator is connected, said angle being about fifteen degrees.

6. The airborne mobile platform of claim 5 wherein said one or more vortex generators includes a second mechanical vortex generator that defines a vortex generator chord line and wherein a direction parallel to said vortex generator chord line of said second mechanical vortex generator establishes a second angle with a direction parallel to a chord line of at least one of said rotor blades on which said second mechanical vortex generator is connected, said second angle being about fifteen degrees and wherein a leading edge of said first mechanical vortex generator and a leading edge of said second mechanical vortex generator are inclined toward one another.

7. The airborne mobile platform of claim 1 wherein said one or more vortex generators includes a first mechanical vortex generator and a second mechanical vortex generator that each define a vortex generator chord line that is inclined relative to a chord line of at least one of said rotor blades on which said first and second mechanical vortex generators are connected.

8. The airborne mobile platform of claim 7 wherein a leading edge of said first mechanical vortex generator and a leading edge of said second mechanical vortex generator are inclined toward one another.

9. The airborne mobile platform of claim 1 wherein said one or more vortex generators include a first pair and a second pair of mechanical vortex generators, each of said mechanical vortex generators in said first pair are spaced from one another about 0.75 inches and said first pair and said second pair of mechanical vortex generators spaced from one another about one inch.

10. The airborne mobile platform of claim 1 further comprising a controller that adjusts said one or more vortex generators based on at least a rotational position of at least one of said rotor blades.

11. The airborne mobile platform of claim 10 wherein said adjustment of said one or more vortex generators includes moving a vane between an extended condition and a retracted condition and wherein said vane in said retracted condition is disposed below a surface of said section of said at least one of said rotor blades.

12. The airborne mobile platform of claim 10 wherein said adjustment of said one or more vortex generators includes at least one of activating one or more vortex generators, deactivating one or more vortex generators, changing a magnitude of a jet flow from one or more vortex generators, changing a frequency of a jet flow from one or more vortex generators, changing a pulse width of a jet flow from one or more vortex generators and one or more combinations thereof.

13. The airborne mobile platform of claim 1 wherein said one or more vortex generators includes an array of closely spaced fluidic vortex generators.

14. The airborne mobile platform of claim 13 further comprising a controller operable to adjust said array of closely spaced fluidic vortex generators, wherein said array of closely spaced fluidic vortex generators establishes a first set of fluidic vortex generators and a second set of fluidic vortex generators and wherein said adjustment of said array of closely spaced fluidic vortex generators includes at least one of activating said first set, deactivating said first set, changing a magnitude of a jet flow from said first set, changing a frequency of a jet flow from said first set, changing a pulse width of a jet flow from said first set and one or more combinations thereof.

15. A method for improving performance of an airborne mobile platform having rotating rotor blades, the method comprising:

rotating rotor blades through an unsteady subsonic airflow having at least a varying angle of attack, each of said rotor blades having a first value of a maximum lift coefficient in said airflow;

using a vane that extends outwardly from a surface of one of said rotor blades to generate vortices over each of said rotor blades, the vane being movable about an axis that is generally perpendicular to a surface of said one rotor blade to move in a yaw direction relative to the airflow; and establishing a second value of said maximum lift coefficient that is greater than said first value of said maximum lift coefficient in said airflow due to said vortices.

16. The method of claim 15 wherein said generating vortices over each of said rotor blades includes moving the vane from a retracted condition to an extended condition.

17. The method of claim 15 wherein said generating vortices over each of said rotor blades further includes injecting and extracting a jet flow.

18. The method of claim 15 wherein said vortices are generated near a leading edge of each of the rotor blades.

19. The method of claim 15 wherein said generating vortices over each of said rotor blades includes altering a shape of said rotor blades to change a velocity distribution over said rotor blades based on placement of one or more vortex generators on said rotor blades.

20. The method of claim 19 wherein said shape of said rotor blades is altered to change at least one of a thickness, a bluntness, a leading edge radius, a camber and one or more combinations thereof.

21. The method of claim 15, further comprising placing a first mechanical vortex generator and a second mechanical vortex generator near a leading edge of each of said rotor blades, and further orienting said first and second mechanical vortex generators so that a leading edge of said first mechanical vortex generator and a leading edge of said second mechanical vortex generator are inclined toward one another.

* * * * *